Oct. 29, 1957  R. A. McCALLUM ET AL  2,811,231
STEERING, BRAKING AND TRAMMING CONTROL FOR MINE VEHICLES
Filed Oct. 26, 1954  5 Sheets-Sheet 5
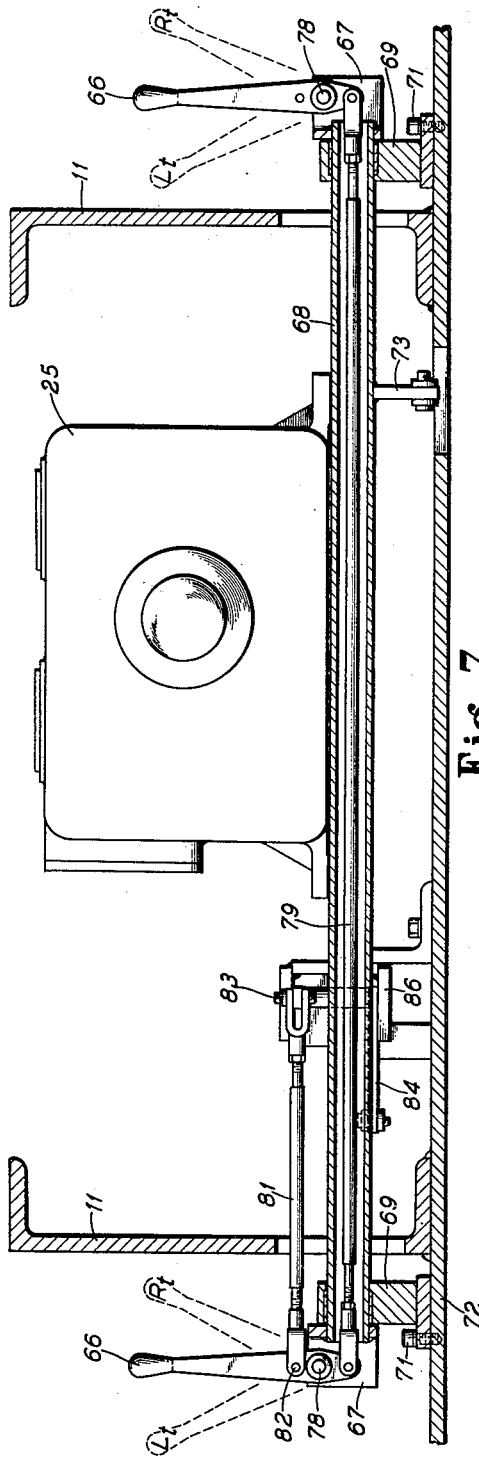
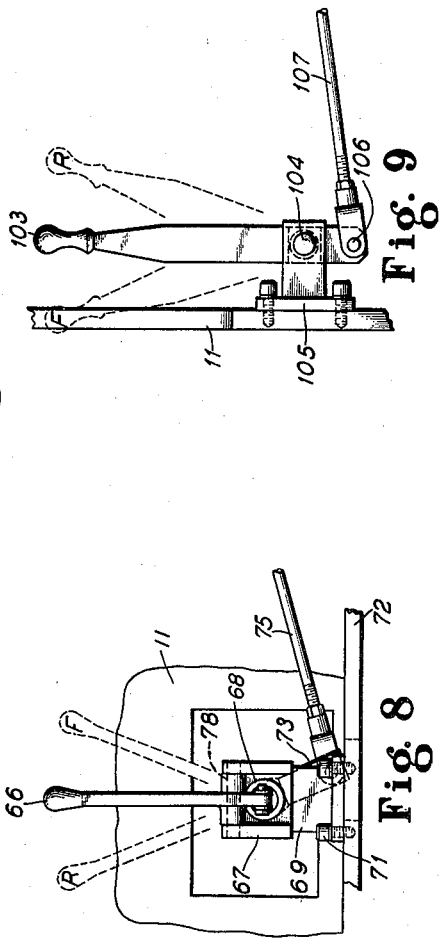
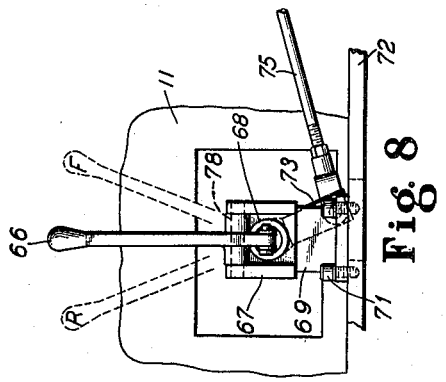
INVENTOR.
Robert A. McCallum
BY  George W. Miller
Murray A. Gleeson
ATTORNEY United States Patent Office 2,811,231
Patented Oct. 29, 1957

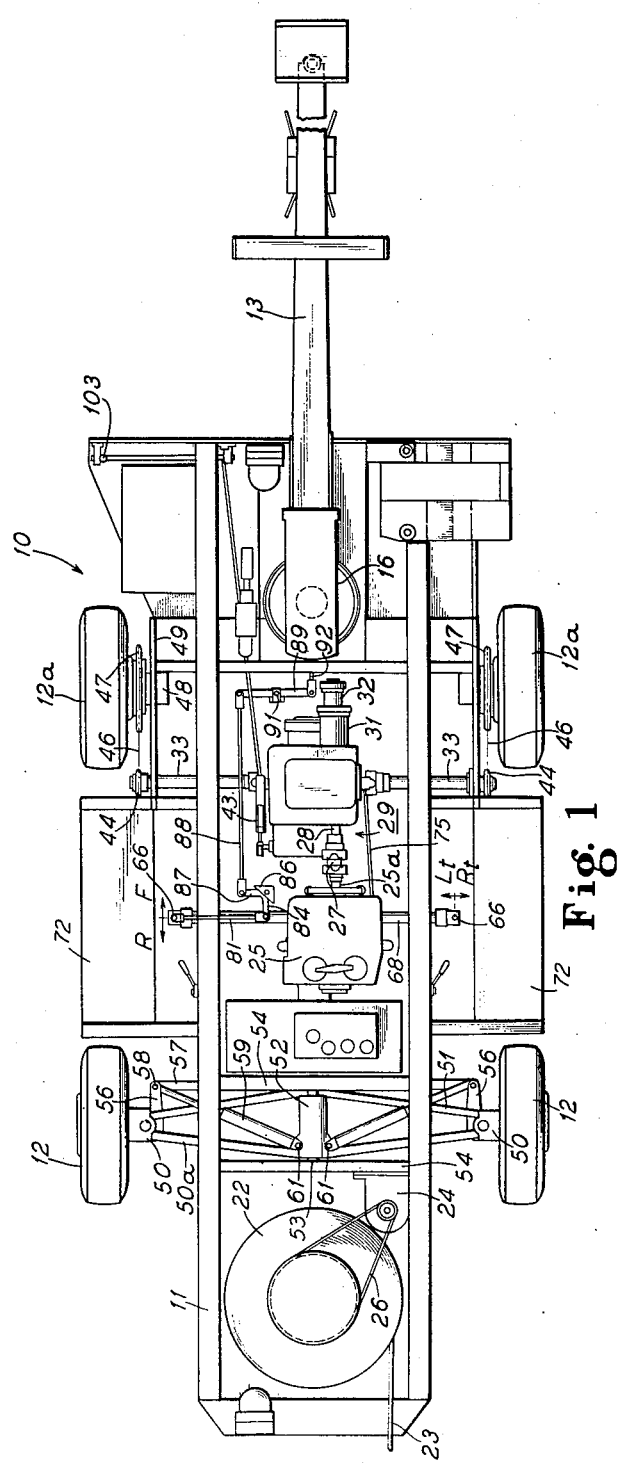

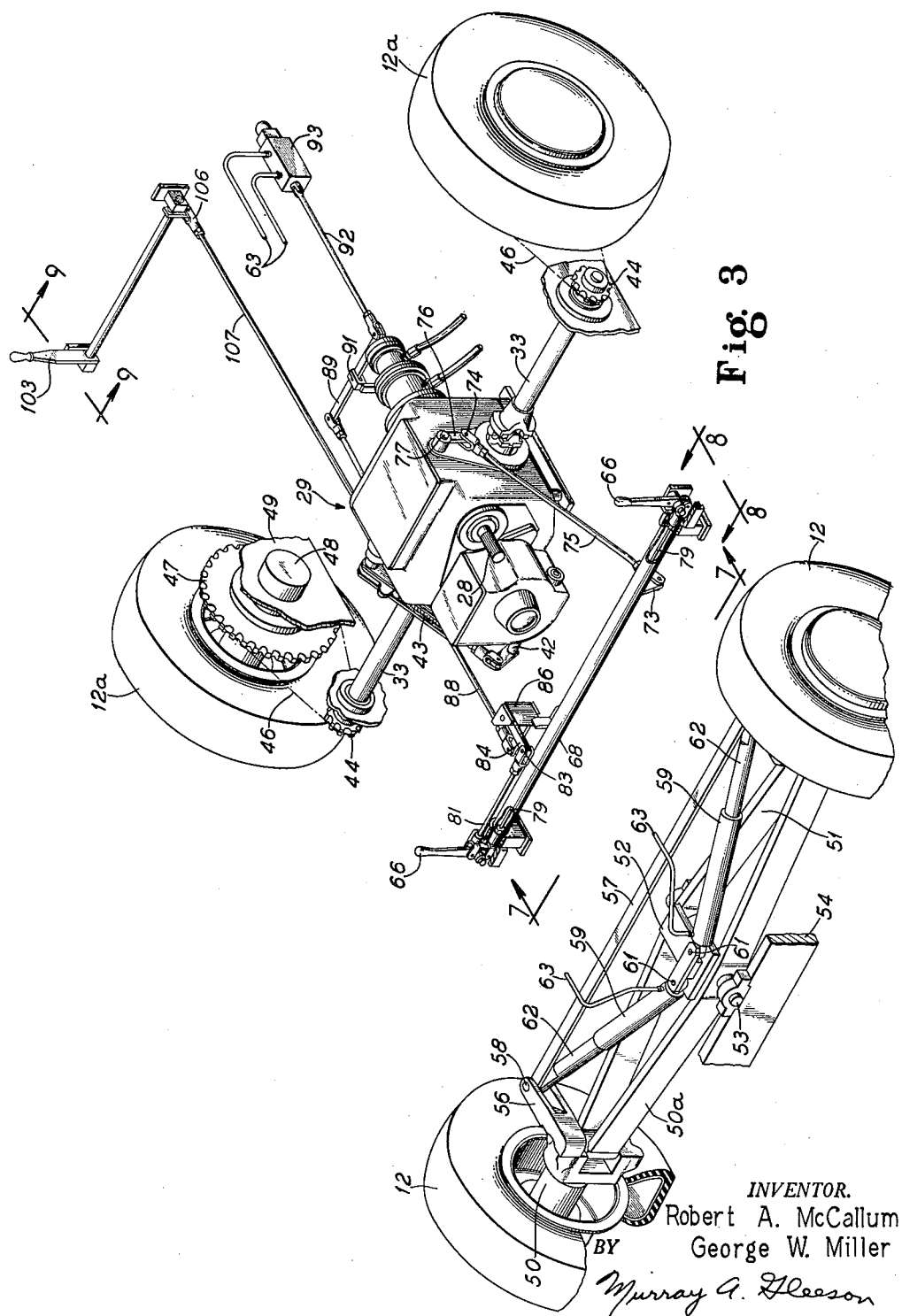

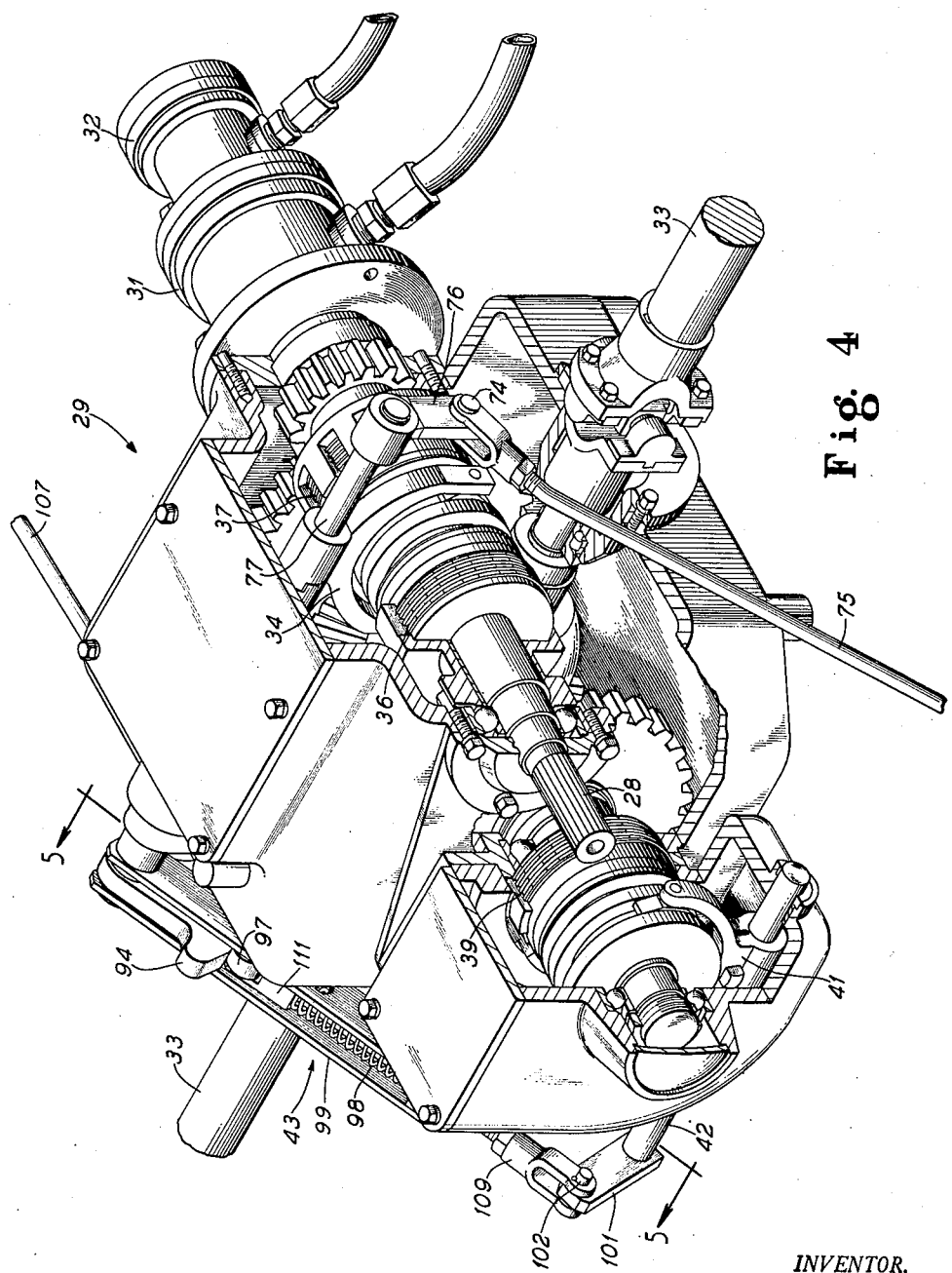

2,811,231

STEERING, BRAKING AND TRAMMING CONTROL FOR MINE VEHICLES

Robert A. McCallum, Clarendon Hills, and George W. Miller, Chicago, Ill., assignors to Goodman Manufacturing Company, Chicago, Ill., a corporation of Illinois Application October 26, 1954, Serial No. 464,702

2 Claims. (Cl. 192—18)

This invention represents an improvement over machines of the general type as shown in Miller Patent No. 2,683,475 for Timbering Machine, and more particularly to improvements in devices for controlling the movement of such vehicles.

One of the principal objects of this invention is to provide an improved mechanism for controlling the direction of a mine vehicle or the like.

Another object is to provide a steering and reverse control for a wheeled mine vehicle whereby its direction can be controlled from a plurality of points on the vehicle.

Yet another object is to provide a steering and drive control for a mine vehicle or the like, and to provide in such vehicle an arrangement whereby this movement can be adjusted nicely from points remote from the main steering and drive control.

Other objects and important features of the invention will be apparent from a study of the following specification taken with the drawings which together show a preferred embodiment of the invention, and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the subjoined claims.

In the drawings:

Fig. 1 is a plan view of a timbering machine of the type as shown in the aforesaid Miller patent, said machine having embodied therein the improvements according to the present invention;

Fig. 2 is an elevation view thereof;

Fig. 3 is a perspective view of the driving and control mechanism of the machine shown in Figs. 1 and 2;

Fig. 4 is a perspective view of a power transmission for the vehicle shown in Figs. 1 and 3, showing details of certain of the control mechanism therefor;

Fig. 7 is a view taken along the line 7—7 of Fig. 3 looking in the direction of the arrows and showing a universally mounted control lever for controlling the movement of the vehicle seen in Figs. 1 to 3 inclusive;

Figure 5:
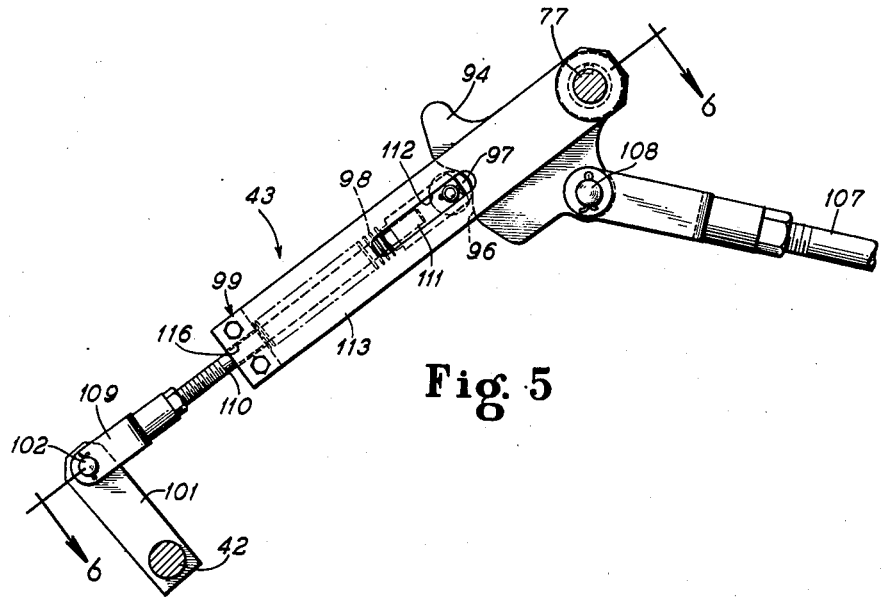
Fig. 5 is an elevation view of a braking mechanism for the power transmission shown in Fig. 4, said view being taken along the line 5—5 of Fig. 4 and looking in the direction of the arrows.
Figure 6:
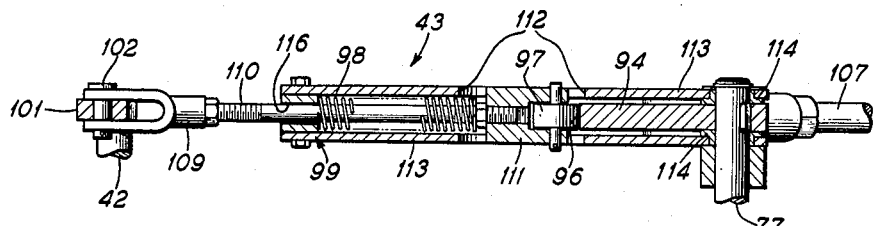
Fig. 6 is a longitudinal sectional view taken along the line 6—6 of Fig. 5 and looking in the direction of the arrows.

Fig. 8 is a side elevation view of the control mechanism seen in Fig. 7, said view being taken along the plane indicated by the lines 8—8 of Fig. 3 and looking in the direction of the arrows; and Fig. 9 is an elevation view of an auxiliary control member disposed at a point remote from the universally mounted control members seen in Figs. 7 and 8, said auxiliary control member being arranged so as to be independent of the movement of the control members seen in Figs. 7 and 8 and being especially adapted for controlling small increments of movement of the vehicle as desired.

Referring now particularly to the drawings, the improvements according to the present invention may be embodied in a mine vehicle 10, and may be of the type as is more particularly described in the aforesaid Miller Patent No. 2,683,475, issued July 13, 1954, for Timbering Machine. For purposes of description and to support the disclosure of the invention herein, such a machine includes a frame 11 arranged to be steered by dirigible wheels 12 and to be driven by wheels 12a. The frame 11 of the vehicle 10 affords a means of support for a boom 13, which is movable in a vertical plane about a pivot 14 with respect to a turntable 16, means if desired being provided, not shown, to swing the turntable 16 in a horizontal plane. The turntable 16 affords a mounting for a lifting cylinder 17 hingedly connected at 18 to the boom 13 and also connected hingedly as at 19 to the turntable 16 whereby the boom 13 may be raised and lowered in a vertical plane. The end of the boom 13 is provided with a stirrup 21 for support of a mine timber, not shown, so that with desired movement of the boom 13 in both a horizontal and a vertical direction, the mine timber may be disposed as desired, preferably against the mine roof preparatory to being supported by roof props.

The vehicle 10 is provided with a cable reel 22 which winds in or pays out a length of cable conductor 23 connected to a fixed junction point, not shown. The cable reel 22 is driven by a fluid motor 24 connected thereto by means of an endless sprocket chain 26. The cable 23 thus supplies power from a remote source to a prime mover or a drive motor 25 having an output shaft 25a which is connected through a flexible coupling 27 to drive an input shaft 28 of a power transmission indicated generally by the reference numeral 29, see also Fig. 4.

The precise details of the power transmission 29 are not important to this invention. Suffice it to say, however, the input shaft 28 also drives an hydraulic pump 31 which supplies power for an hydraulically driven chain saw, not shown, but described in detail in the aforesaid Miller patent, and also a hydraulic pump 32 which supplies hydraulic fluid for raising the boom 13, controlling operation of the cable reel 22, and for steering of the dirigible wheels 12, the operation of which wheels will be described in more detail as this specification continues.

Irrespective of the precise form of the transmission 29, it is so arranged as to have a pair of output shafts 33, 33, the direction of rotation of which is controlled by a shifter yoke 34, which is shifted in one direction or another according to the driving direction of the vehicle 10. The shifting of the yoke 34 causes engagement of one or the other of directional clutches 36 or 37 according to the direction of movement of the vehicle. Means for controlling the shifter yoke will be described in more detail as this specification proceeds.

The transmission 29 is provided with a brake 39, under the control of a brake actuator yoke 41, which is rocked to and from brake engaging position by means of a rock shaft 42, rock arm 101, and a control assembly therefor indicated generally by the reference numeral 43. The brake 39 is so arranged as to be in engaged position when the shifter yoke 34 is in the neutral position, and to be released when the shifter yoke 34 is moved to either the forward or reverse position.

Referring back to Figs. 1 and 3 particularly, each output shaft 33 is connected through a chain reduction drive consisting of a drive sprocket 44, a sprocket chain 46 and a driven sprocket 47 fast to the driving wheel 12a, each wheel 12a being mounted upon a stub shaft 48 extending from one of the side walls 49 upstanding from the bottom plate 72.

Referring now again to Figs. 1 and 3 dirigible wheels 12 are each movable upon spindles 50 which are arranged to pivot with respect to a laterally extending cross axle consisting of laterally extending members 50a and 51, connected at their mid-point by means of a member 52, the member 52 being pivoted at 53 between a pair of cross members 54, 54 spanning the frame members 11. Each of the spindles 50 is provided with a steering knuckle 56. Knuckles 56 are spanned by a tie bar 57 which is hingedly connected at each end as at 58 to the respective steering knuckles 56, as seen more clearly in Fig. 3.

The dirigible wheels 12 are steered by means of cylinders 59, each being anchored at 61 to the member 52, and each having pistons 62 which are hingedly connected at ends remote from the cylinders 59 at the connection points 58 of the tie bar 57 to the steering knuckles 56. Each of the cylinders 59 has a pressure conduit 63 connected thereto, pressure fluid being supplied to one cylinder whilst the other cylinder is being exhausted to control the direction of the dirigible wheels 12 as will now be described in more detail.

Means are provided for controlling the transmission 29 to effect forward and reverse movement of the vehicle 10 and to control the operation of the steering cylinders 59, 59 to change its direction. To this end a universally mounted control handle 66 is mounted on each side of the vehicle frame 11, as seen more particularly in Fig. 7. The control handle 66 is mounted for rocking movement in directions as indicated by the symbols R and F in a plane parallel to the vehicle frame members 11 as seen in Figs. 1 and 2. The control lever 66 is mounted for such movement upon a support block 67 which is rigidly fixed to a tube 68 spanning the distance between the frame members 11. The tube 68 is journaled at each end in supports 69 which are held by means of cap screws 71 to a base plate 72 spanning the distance between the frame members 11. Rocking of the tube 68 by the aforementioned movement of the control handle 66 in the plane parallel to the frame member 11 causes a rock arm 73, see Fig. 3 to be rocked in corresponding direction.

The rock arm 73 is hingedly connected to an actuator rod 75 which is hingedly connected at 74 to an actuating arm 76 mounted fast to a rock shaft 77. A seen in Fig. 4, the rocking of the rock shaft 77 controls the direction of movement of the shifter yoke 34 to control the desired direction of rotation of the output shafts 33.

The control lever 66 is also arranged to be moved in a plane normal to the longitudinal axis of the vehicle 10 to effect steering movement of the dirigible wheels 12, 12. As seen in Fig. 7 the control levers 66 are each pivoted at 78 to the bracket 67, and the lower ends of the control lever 66 are connected together by a tie rod 79 housed within the hollow tube 68. The two control levers are thus linked together and motion in the Lt. or Rt. direction causes movement of an actuator rod 81 pivotally connected at 82 to one of the control levers 66 and pivoted at 83 to a bell crank 84, see also Fig. 3. Said bell crank is pivoted at a support 86, see Fig. 1 and the other arm 87 thereof is hingedly connected to an actuator arm 88. Said actuator arm 88 is connected by means of a lever 89 pivoted at a central point 91 to an actuator 92 for a control valve 93 for the steering wheels 12.

The precise construction of the control valve 93 forms no part of the present invention, and any suitable form may be employed. However, rocking of the control lever 66 in the Lt. or Rt. direction causes one of the cylinders 59 to be released of its pressure fluid while the other cylinder 59 is supplied with pressure fluid to control the steering of the wheels 12.

Means are provided for releasing the brake 39 whenever the control handle 66 is urged in either the F or R direction. To this end the rock shaft 77 which operates the shifter yoke 34 is arranged simultaneously to release the brake 39. The rock shaft 77 accordingly has a detent member 94 mounted thereon, which detent member has an edge depression 96 into which a detent follower roller 97 is normally positioned during positions of rest of the vehicle 10. The detent follower 97 is carried in a clevis 111 which is slidably mounted in slots 112 in furcations 113 of a bifurcated bracket 99 disposed to one side of the transmission housing 29. The furcations 113 are pivotally mounted on shaft 77 by means of plain bearings 114 disposed on either side of the detent member 94. A clevis rod 110 passes freely through a hole 116 in the end of bracket 99 and connects the detent follower supporting clevis 111 to clevis 109 which is pivotally connected at 102 to an arm 101 secured to rock shaft 42. The roller 97 is urged against the edge of the detent member 94 by means of a spring 98 which is compressed between the detent follower supporting clevis 111 and the bottom of bracket 99. Whenever the roller 97 is resting in the depression 96, the initial compression of the spring 98 is utilized to hold the brake 39 in the engaged position. When the detent member 94 is rocked by the shaft 77 in either direction from the Fig. 5 position, the detent follower roller 97 will be urged in a direction to rock the shaft 42 controlling the brake actuating yoke 41.

It will thus be seen that operation of the control lever 66 for either forward or reverse tramming of the vehicles will at the same time cause release of the brake 39.

Means are also provided for "inching" of the vehicle when it may be necessary to position the boom 13 at a desired point. To this end a remote control lever 103 is disposed upon the vehicle at a position close to the boom 13, see particularly in Figs. 1, 3 and 9. The control lever 103 is pivoted at 104 to a bracket 105 extending from the frame 11. The control lever 103 is hingedly connected at 106 to an actuating arm 107, see also Figs. 3 and 5, which is hingedly connected at 108 to the detent 94. The lever 103 is enabled to be rocked in the forward or reverse direction as shown and upon so doing the rock shaft 77 will be rocked in a corresponding direction to control the shifting of the yoke 34 in a desired direction for such small increments for forward or reverse movement of the vehicle 10.

From the foregoing description it is believed evident that there has been provided, a novel and useful improvement in mine vehicles of the general kind referred to. Tramming movement of the vehicle can easily be accomplished from a plurality of points upon the vehicle by operation of a single control lever having universal movement. After tramming of the vehicle to the desired position, it may also be moved through small distances without need of the steering mechanism to spot it in the desired position.

While the invention has been described in terms of a preferred embodiment thereof, it is not intended to be limited by the precise embodiment herein shown nor otherwise than by the scope of the claims here appended.

We claim as our invention:

1. In a vehicle, a power transmission including a power input shaft and a power output shaft, a pair of clutches on said power input shaft and actuatable separately for determining the direction of rotation of said power output shaft, a rock shaft and clutch actuating means operable by said rock shaft when rocked from a neutral position to either clutching position, a brake on said power output shaft, a second rock shaft, brake release means operable upon rocking of said second rock shaft, and means for rocking said second rock shaft concomitantly with the rocking of said first rock shaft to either clutching position comprising a detent on said first rock shaft and rockable therewith, a rock arm on said second rock shaft, a detent follower connected to said rock arm and manually engaging a slot in said detent, a pair of surfaces on each side of said detent slot arranged upon rocking of said first rock shaft to move said detent follower and said rock arm in a direction to release said brake and spring means urging said detent follower into said detent slot and said first named rock shaft to a neutral position, and said rock arm and said second rock shaft to a position for engagement of said brake.

2. In a vehicle, a power transmission including a power input shaft and a power output shaft, a pair of clutches on said power input shaft and actuatable separately for determining the direction of rotation of said power output shaft, a rock shaft and clutch actuating means operable by said rock shaft when rocked from a neutral position to either clutching position, a brake on said power output shaft, a second rock shaft, brake release means operable upon rocking of said second rock shaft, and means for rocking said second rock shaft concomitantly with the rocking of said first rock shaft to either clutching position comprising a detent supported on said first rock shaft and rockable therewith, a rock arm on said second rock shaft, a detent follower connected to said rock arm and engaging said detent, and spring means urging said detent and said first named rock shaft to a neutral position, and said rock arm and said second rock shaft to a position for engagement of said brake.

References Cited in the file of this patent

UNITED STATES PATENTS

| | | |
|---|---|---|
| 1,748,041 | Backhus | Feb. 18, 1930 |
| 2,323,817 | Lee | July 6, 1943 |

FOREIGN PATENTS

| | | |
|---|---|---|
| 21,108 | Great Britain | Sept. 23, 1908 |